Feb. 9, 1926.

J. S. LAWRENCE 1,572,541

ROTARY ENGINE

Filed May 1, 1924

Inventor

J. S. Lawrence.

By

Lacey & Lacey, Attorneys

Feb. 9, 1926.

J. S. LAWRENCE 1,572,541

ROTARY ENGINE

Filed May 1, 1924     3 Sheets-Sheet 3

Inventor

J. S. Lawrence.

By Lacey Lacey, Attorneys

Patented Feb. 9, 1926.

1,572,541

UNITED STATES PATENT OFFICE.

JAMES S. LAWRENCE, OF TWIN FALLS, IDAHO.

ROTARY ENGINE.

Application filed May 1, 1924. Serial No. 710,369.

*To all whom it may concern:*

Be it known that I, JAMES S. LAWRENCE, a citizen of the United States, residing at Twin Falls, in the county of Twin Falls and State of Idaho, have invented certain new and useful Improvements in Rotary Engines, of which the following is a specification.

The present invention relates to internal combustion engines and has for its object to mount practically all working parts to revolve around a common axis. These parts are balanced around said axis and serve together as a fly wheel for the engine.

An advantage of this arrangement is that the engine will be self-cooling and that no water cooling is necessary.

Another object of the invention is to so construct the same that the number of parts is brought down to a minimum and that accordingly there is very little chance of the engine getting out of order or breaking down.

In the accompanying drawings:

Figure 1 is a side elevation and partial section;

Figure 4 is a partial section along line 4—4 of Figure 1;

Figure 2:
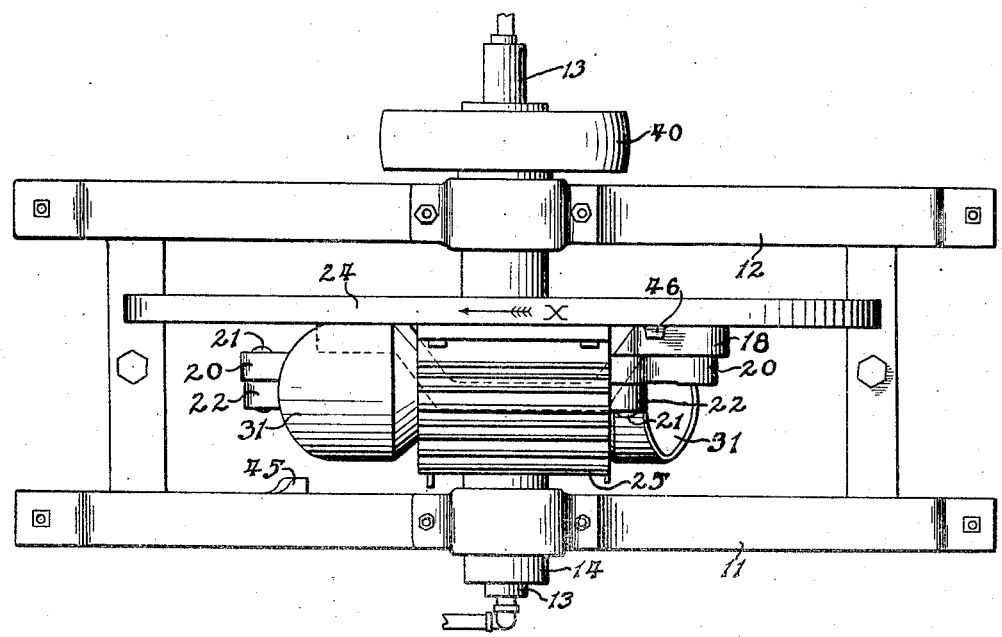
Figure 2 is a top plan view thereof.

In the drawings, reference numeral 10 represents a stand for the engine consisting of two triangular side frames 11 and 12 each forming a bearing for a main shaft 13. In the frame 11 is secured a sleeve 14 enclosing a portion of the shaft 13 and having its inner end substantially midway between the frames 11 and 12. At the inner end of this sleeve is provided a ball bearing 15 concentric with the axis of the shaft 13 and immediately back of this ball bearing is furnished an eccentric 16 also carrying a ball bearing 17.

Upon this eccentric 16 is mounted a slide 18 engaging the ball bearing 17 and upon the concentrically mounted ball bearing 15 is rotatably fitted a fulcrum member or yoke 19. At each end of the slide 18, as at 41, is pivoted a rocking lever 20 which has hinged connection, as at 21, with a pitman 22 for a working piston 23, the lever being fulcrumed at 42 on the adjacent end of the yoke 19. It is advantageous to keep the pivot points 41 and 42 as close as possible to the axis of the shaft 13.

Figure 3:
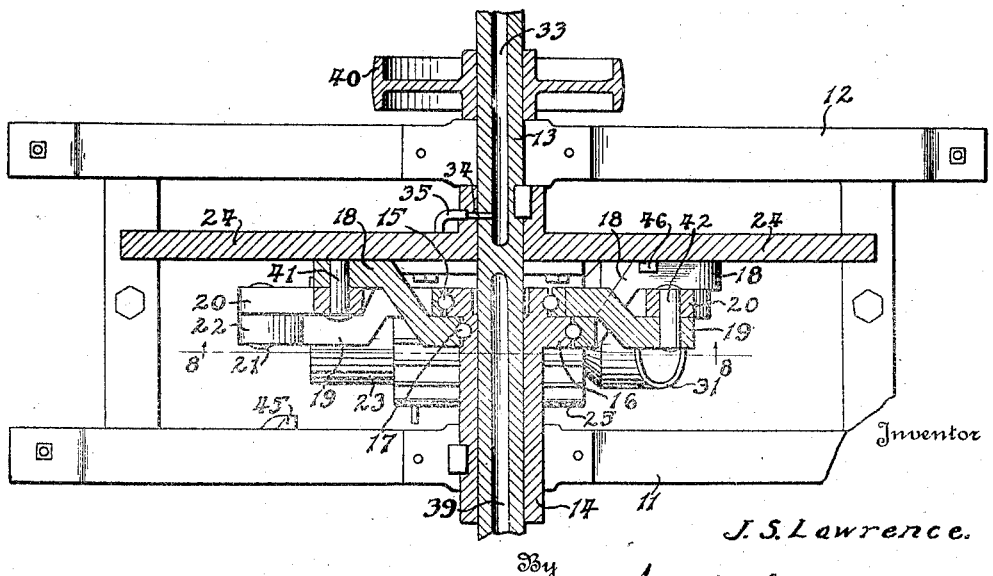
Figure 3 is a section along line 3—3 of Figure 1.
Figure 5:
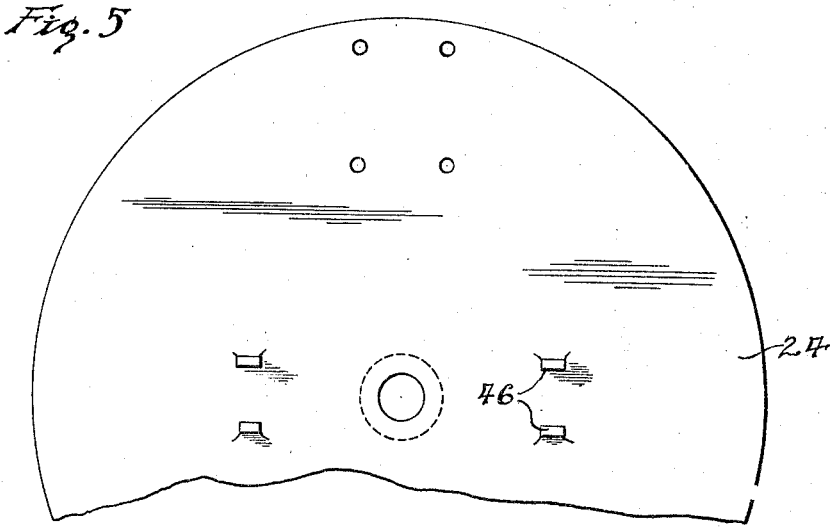
Figure 5 is a fragmentary side elevation of the revolving disc.
Figure 6:
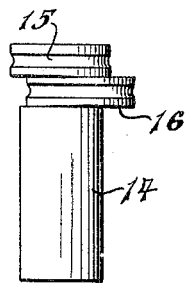
Figure 6 is a top plan view of a stationary bearing.
Figure 8:
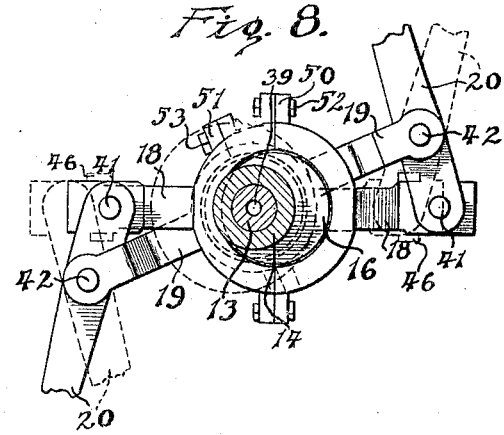
Figure 8 is a fragmentary section along line 8—8 of Figure 3.
Figure 7:
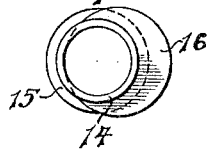
Figure 7 is an end view of Figure 6.

A disc 24 is keyed or in any other suitable manner rigidly secured on the main shaft 13, as best seen in Fig. 3. Upon this disc are mounted working cylinders 25, two being shown in the drawings at diametrically opposite points thereof and equi-distantly positioned from its axis. It is evident that the number of working cylinders may be varied and that any number may be used. Each cylinder is provided with the usual inlet port 26 and outlet port 27, the latter being opened by the piston 23 at the end of each stroke in the usual manner. At 28 is shown a spark plug and at 29 a self-acting air inlet valve which is closed by a spring 30. Over the end of the cylinder carrying the spark plug and the air inlet valve is furnished a hood 31 forming an air funnel that will collect air when the engine is rotated in the direction of arrow X, see Figure 1, in order to rush air into the cylinder when the exhaust port 27 is uncovered by the piston. As the cylinders are rotated at a considerable speed there will generally be no need for a water cooling system and to facilitate the cooling of the cylinder, the same is provided with radiating fins 32, see Figure 4. The shaft 13 has a central bore 33 extending part way into the shaft and this bore is suitably connected with a fuel source, the fuel being fed into the bore by gravity. At 34 is shown a port leading from said bore 33 and running through the hub of the disc 24, and a feed pipe 35 connects this port with an injection pump 36 secured at the inlet port 26 of the cylinder. The pump is synchronized to inject the fuel into the cylinder at the proper time and this may be accomplished by an operating finger 45 provided on a stationary part of the engine.

A double conductor 37 is furnished for the spark plug 28 and the ignition is timed by contact furnished on the main shaft 13.

As already stated, no water cooling system is considered necessary for this engine but provision has been made to supply water if found necessary, in which case it may be supplied to a central bore 39 in the main shaft 13. It is evident that this bore does not reach the fuel supply bore 33 but that a partition is left between the inner ends of the bores in the shaft. From the bore 39 the water will be drawn into a jacket furnished around each cylinder.

The slide 18 is guided upon the disc 24 between lugs 46 projecting from said disc. Thus the slide is made to partake in the revolution of the disc, while at the same time it obtains a reciprocating movement in diametrical direction thereon through its connection with the eccentric 16.

At 40 is shown a belt pulley for driving the machinery for which the engine has been erected.

The operation of the engine is as follows:

When the fuel mixture is exploded in the cylinder with the piston 23 in the position shown in section in Figure 1, the forces act in both directions against the end of the piston and the end of the cylinder. This will cause the disc 24 to revolve in the direction of arrow X, Figure 1, while the lever 20 is oscillated around its fulcrum 19. This action is communicated through the pivot pin 41 to the slide 18 which in turn acts on the eccentric 16 so that the disc in this manner is kept in motion. At the time the explosion takes place in the upper cylinder shown in Figure 1, the lower cylinder is simultaneously being exhausted. The fuel injection, compression and exhaust, taking place in the usual manner in the cylinders, need not further be described.

It will be evident that the slide 18 during one revolution of the disc 24, while partaking in said revolution, will make one reciprocation from right to left and return in diametrical direction of the disc. The yoke 19 also partakes in the revolution of the disc 24 but on account of its connection through the pivot pin 42 with the rocking lever 20 will also obtain a slight oscillation as regards a diametrical line of the disc 24.

On account of the cylinders being situated at a comparatively great radial distance from the axis of revolution, the force of explosion will exert a greater leverage than in ordinary engines. The relative position of the working parts is such that the explosion occurs at the point of greatest possible leverage.

In the drawings, the disc 24 is shown with working cylinders only on one side, but it is evident that they may be supplied on both sides thereof, particularly for high power engines.

When necessary and in order to facilitate assembling, the slide 18 as well as the yoke 19 are each made in two parts and split along diametrical lines. Lugs 50 and 51 have been shown where the halves are joined together and clamping bolts 52 and 53, respectively, through the lugs.

Instead of providing the sleeve 14 with an eccentric 16 for the slide 18, it is evident that a crank would serve the same purpose.

The engine may naturally be constructed as a two-stroke cycle engine or as a four-stroke cycle engine as found most suitable for different conditions.

Having thus described the invention, what is claimed as new is:

1. In an internal combustion engine, a revoluble member, a working cylinder carried by said member, a stationary bearing for said member, a piston in said working cylinder, a member to rotate therewith and slidable radially thereon mounted on said revoluble member, a rocking lever having pivotal connection at its opposite ends with said piston and said slidable member respectively, a fulcrum element for said rocking lever adapted to rotate with said revoluble member and fixed relative thereto, and means mounted on the stationary bearing to reciprocate said slidable member.

2. In an internal combustion engine, a shaft revolubly mounted, working cylinders positively connected with said shaft at uniform radial distances therefrom, pistons for said cylinders, a slidable member mounted on a diameter of the shaft to rotate therewith, a rocking lever for each piston having pivotal connection at one end therewith and at the opposite end with said slidable member, an arm mounted upon a diameter of said shaft and fixed relative thereto, said rocking levers being respectively fulcrumed on the opposite ends of said arm, and means for reciprocating said slidable member diametrically with relation to said shaft.

3. In an internal combustion engine, a shaft revolubly mounted, working cylinders positively connected with said shaft at uniform radial distances therefrom, pistons for said cylinders, a slidable member mounted on a diameter of said shaft to rotate therewith, a rocking lever for each piston having pivotal connection at one end therewith and at the opposite end with said slidable member respectively, an arm mounted upon a diameter of said shaft and fixed relative thereto, said rocking levers being respectively fulcrumed on the opposite ends of said arm, and means for reciprocating said slidable member diametrically with relation to said shaft; said means comprising a stationary bearing for said shaft, and an eccentric fixed on the bearing and in engagement with said slidable member.

4. In an internal combustion engine, a shaft revolubly mounted, a disc secured concentrically on said shaft, working cylinders rigidly secured upon said disc at uniform radial distances from its axis, pistons for said cylinders, a slidable member, mounted diametrically on said disc to rotate therewith, a rocking lever for each piston having pivotal connection at one end therewith and at the opposite end with said slidable member respectively, an arm concentrically mounted upon said shaft, and fixed relative to the disc, said rocking levers being respectively fulcrumed on the opposite ends of said arm, and means for reciprocating said slidable member diametrically with relation to said shaft.

5. In an internal combustion engine, a shaft revolubly mounted, a disc secured concentrically on said shaft, working cylinders rigidly secured on a side of said disc at uniform radial distances from its axis, pistons for said cylinders, a slidable member mounted diametrically on the disc to rotate therewith, a rocking lever for each piston having pivotal connection at one end therewith and at its opposite end with said sliding member respectively, an arm concentrically mounted upon said shaft, said rocking levers being respectively fulcrumed on opposite ends of said arm, and means for reciprocating said slidable member diametrically with relation to said shaft; said means comprising a stationary bearing for said shaft, and an eccentric on said bearing in engagement with said slidable member.

6. In an internal combustion engine, a shaft revolubly mounted, a disc secured concentrically on said shaft, working cylinders rigidly secured on a side of said disc at uniform radial distances from its axis, pistons for said cylinders, a slidable member mounted diametrically on the disc to rotate therewith, guides on said disc for said slidable members, a rocking lever for each pistion having pivotal conection at one end therewith and at the opposite end with said sliding member respectively, an arm concentrically mounted upon said shaft, said rocking levers being respectively fulcrumed on the opposite ends of said arm, and means for reciprocating said slidable member diametrically with relation to said shaft; said means comprising a stationary bearing for said shaft, and an eccentric on the bearing in engagement with said slidable member.

7. In an internal combustion engine, a shaft revolubly mounted, a disc secured concentrically on said shaft, working cylinders rigidly secured on a side of said disc at uniform radial distances from its axis, pistons for said cylinders, said cylinders being provided with suitable intake and exhaust ports, said shaft having a hollow end portion connected with a fuel source and having a port leading from the hollow end portion of said shaft, pipe connection between said port and the intake ports of the cylinders; a slidable member mounted diametrically on the disc to rotate therewith, guides on said disc for said sliding member, a rocking lever for each piston having pivotal connection at one end therewith and at the opposite end with said sliding member respectively, an arm concentrically mounted upon said shaft, said rocking levers being respectively fulcrumed on the opposite ends of said arm, and means for reciprocating said slidable member diametrically with relation to said shaft; said means comprising a stationary bearing for said shaft, and an eccentric on the bearing in engagement with said slidable member.

8. In an internal combustion engine, a revoluble member having a working cylinder, a stationary bearing for said revoluble member, a piston in said working cylinder, a member slidably mounted on a diameter of said revoluble member, a rocking lever having pivotal connection at one end with said piston and at the opposite end with said slidable member respectively, and a fulcrum element for said rocking lever adapted to rotate with said revoluble member, said slidable member having eccentric connection with said stationary bearing.

In testimony whereof I affix by signature.

JAMES S. LAWRENCE. [L. S.]